(12) United States Patent
Bae et al.

(10) Patent No.: US 11,513,548 B2
(45) Date of Patent: Nov. 29, 2022

(54) APPARATUS AND METHOD FOR TRACKING MAXIMUM POWER

(71) Applicants: SAMSUNG ELECTRONICS CO., LTD., Suwon-si (KR); Research & Business Foundation SUNGKYUNKWAN UNIVERSITY, Suwon-si (KR)

(72) Inventors: Chisung Bae, Yongin-si (KR); Hyungmin Gi, Suwon-si (KR); Yeohoon Yoon, Suwon-si (KR); Yoonmyung Lee, Seongnam-si (KR)

(73) Assignees: Samsung Electronics Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 106 days.

(21) Appl. No.: 17/200,017

(22) Filed: Mar. 12, 2021

(65) Prior Publication Data

US 2022/0107661 A1 Apr. 7, 2022

(30) Foreign Application Priority Data

Oct. 6, 2020 (KR) .................. 10-2020-0128892

(51) Int. Cl.
*G05F 1/67* (2006.01)
*H02J 7/35* (2006.01)

(52) U.S. Cl.
CPC .............. *G05F 1/67* (2013.01); *H02J 7/35* (2013.01); *H02J 2300/26* (2020.01)

(58) Field of Classification Search
CPC ............ G05F 1/67; H02J 7/35; H02J 2300/26
See application file for complete search history.

(56) References Cited

U.S. PATENT DOCUMENTS

| 9,065,336 B2 | 6/2015 | Huang et al. |
| 10,396,590 B2 | 8/2019 | Teggatz et al. |

FOREIGN PATENT DOCUMENTS

| CN | 103677067 A | 3/2014 |
| JP | 2008-251612 A | 10/2008 |
| KR | 10-2010-0000095 A | 1/2010 |

(Continued)

OTHER PUBLICATIONS

Liu, Xiaosen et al., "An 86% Efficiency 12 µW Self-Sustaining PV Energy Harvesting System with Hysteresis Regulation and Time-Domain MPPT for IOT Smart Nodes," *IEEE Journal of Solid-State Circuits*, 50, 6, Jun. 2015 (pp. 1424-1437).

*Primary Examiner* — Robert L Deberadinis
(74) *Attorney, Agent, or Firm* — NSIP Law

(57) ABSTRACT

An apparatus and method for tracking maximum power are disclosed. The apparatus is configured to track a maximum power at a certain node of an electronic circuit, adjust an impedance of the electronic circuit such that power at the node is maximal, and adjust an impedance of the electronic circuit by comparing power at two points in time to increase power. The apparatus for tracking a maximum power, includes a charge sharing capacitor connected to an initial capacitor in parallel, a first switch disposed between the initial capacitor and an energy harvesting power supply, a second switch disposed between the initial capacitor and the charge sharing capacitor, a third switch disposed between the energy harvesting power supply and a comparator, and a switched-capacitor power converting circuit configured to control the initial capacitor.

21 Claims, 5 Drawing Sheets

(56) References Cited

FOREIGN PATENT DOCUMENTS

| | | | |
|---|---|---|---|
| KR | 10-0989441 | B1 | 10/2010 |
| KR | 10-1945701 | B1 | 2/2019 |
| WO | WO 2010/130273 | A1 | 11/2010 |

APPARATUS AND METHOD FOR TRACKING MAXIMUM POWER

CROSS-REFERENCE TO RELATED APPLICATIONS

This application claims the benefit under 35 USC § 119(a) of Korean Patent Application No. 10-2020-0128892 filed on Oct. 6, 2020, in the Korean Intellectual Property Office, the entire disclosure of which is incorporated herein by reference for all purposes.

BACKGROUND

Field

The following description relates to a maximum power tracking technology, and more particularly to comparing power at two points in time using a switched-capacitor.

2. Description of Related Art

In many cases, there may need to determine an increase and a decrease in power that varies in real time at a certain node of an electronic circuit system. Among many methods used to track power of an electronic circuit system, there is maximum power point tracking (MPPT) that tracks maximum power.

A maximum power point may be reached by comparing power transferred from two time points and repeating or iterating a process of adjusting an internal impedance. For example, a perturb and observe (P&O) algorithm may discover a maximum power point by comparing power transferred from two time points.

Using a resistance component, it is possible to measure power of a certain node. The power may be calculated by measuring each of a current and a voltage that passes through a resistor and multiplying the measured current and voltage. A maximum power point may be reached by comparing power at two time points calculated in such a way and controlling an electronic circuit to increase the power. However, there may be a power loss due to the resistance component.

A maximum power point may be reached using an inverse relationship between a charging time of a capacitor and power. The maximum power point may be reached by applying the capacitor to the node and consistently maintaining a high voltage and a low voltage at both ends of the capacitor, measuring a time for which the capacitor is charged, converting the measured time to a digital signal, and analyzing the digital signal. For example, a time-domain quantization method may be used. However, such a method may require an additional configuration for determining a start point and an end point of the charging and an additional configuration for converting to a digital signal, thereby increasing circuit complexity.

To determine an increase and decrease in power, power needs to be measured. To measure the power, a multiplication operation between a voltage (V) and a current (I) needs to be performed. However, to perform this, there may be two challenges to overcome. First, a current needs to be measured. Although a voltage component is directly sensed through a capacitor and then stored, a current component may not be readily measured. In a case of using an independent current sensor to measure a current, a great amount of power may be consumed and system complexity may increase.

A second challenge in tracking an increase and decrease in power is a multiplication operation. Although an analog-to-digital converter (ADC) performs a multiplication operation between a current and a voltage in a digital domain, a power loss may occur due to the ADC, and a resolution may be reduced in a process of converting an analog voltage to a digital equivalent.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for tracking a maximum power, including a charge sharing capacitor connected to an initial capacitor in parallel, a first switch disposed between the initial capacitor and an energy harvesting power supply, a second switch disposed between the initial capacitor and the charge sharing capacitor, a third switch disposed between the energy harvesting power supply and a comparator, and a switched-capacitor power converting circuit configured to control the initial capacitor, wherein the switched-capacitor power converting circuit is further configured to set the capacitance of the initial capacitor to be a capacitance at a present time, the energy harvesting power supply is configured to apply, to the initial capacitor, a first voltage of the present time determined based on a set capacitance of the initial capacitor, the comparator is configured to sense a second voltage of the present time from the initial capacitor or the charge sharing capacitor, in response to the energy harvesting power supply being opened and the initial capacitor and the charge sharing capacitor being connected in parallel, the switched-capacitor power converting circuit is further configured to set the capacitance of the initial capacitor to be an increased capacitance at a subsequent time, the energy harvesting power supply is further configured to apply a third voltage of the subsequent time to the comparator based on an operating frequency changed by the increased capacitance of the initial capacitor, and the comparator is further configured to compare the second voltage and the third voltage and to determine whether to increase or decrease the increased capacitance of the initial capacitor.

The switched-capacitor power converting circuit may be configured to set the capacitance of the initial capacitor to be the capacitance at the present time, in response to a determination to increase a capacitance of the initial capacitor at a previous time.

The energy harvesting power supply may be configured to short-circuit the first switch to apply the first voltage of the present time to the initial capacitor.

In response to the first switch being opened, and the energy harvesting power supply being opened the second switch may be short-circuited and the initial capacitor and the charge sharing capacitor may be connected in parallel, and the comparator may be configured to sense the second voltage of the present time from the initial capacitor or the charge sharing capacitor.

The switched-capacitor power converting circuit may be configured to set the capacitance of the initial capacitor to be the increased capacitance at the subsequent time based on the determination to increase the capacitance at the previous time.

The comparator may be configured to determine to increase the increased capacitance of the initial capacitor, in response to the third voltage being greater than the second voltage, and determine to decrease the increased capacitance of the initial capacitor, in response to the third voltage being less than the second voltage.

In response to a determination to decrease a capacitance of the initial capacitor at a previous time, the switched-capacitor power converting circuit may be configured to set the capacitance of the initial capacitor to be a capacitance at the present time, the comparator may be configured to sense a third voltage from the energy harvesting power supply determined based on the set capacitance of the initial capacitor, the switched-capacitor power converting circuit may be configured to set the capacitance of the initial capacitor to be a decreased capacitance at the subsequent time, the energy harvesting power supply may be configured to apply a first voltage of the subsequent time to the initial capacitor based on an operating frequency changed by the decreased capacitance of the initial capacitor, the comparator may be configured to sense a second voltage of the subsequent time from the initial capacitor or the charge sharing capacitor, in response to the energy harvesting power supply being opened and the initial capacitor and the charge sharing capacitor being connected in parallel, and the comparator may be configured to compare the second voltage and the third voltage and to determine whether to increase or decrease the decreased capacitance of the initial capacitor.

The switched-capacitor power converting circuit may be configured to set the capacitance of the initial capacitor to be the decreased capacitance of the initial capacitor at the subsequent time based on the determination to decrease the capacitance at the previous time.

The first switch may be short-circuited, and the energy harvesting power supply may be configured to apply the first voltage of the subsequent time to the initial capacitor based on the decreased capacitance of the initial capacitor.

The first switch may be opened, and the energy harvesting power supply may be opened, the second switch may be short-circuited and the initial capacitor and the charge sharing capacitor may be connected in parallel, and the comparator may be configured to sense the second voltage of the subsequent time from the initial capacitor or the charge sharing capacitor.

The comparator may be configured to determine to decrease the decreased capacitance of the initial capacitor, in response to the third voltage being greater than the second voltage, and determine to increase the decreased capacitance of the initial capacitor, in response to the third voltage being less than the second voltage.

In another general aspect, there is provided a method of tracking a maximum power, including setting a capacitance of an initial capacitor to be a capacitance at a present time, applying a first voltage of the present time to the initial capacitor through an energy harvesting power supply based on the set capacitance of the initial capacitor, sensing a second voltage of the present time by opening the energy harvesting power supply and connecting a charge sharing capacitor to the initial capacitor in parallel, setting the capacitance of the initial capacitor to be an increased capacitance at a subsequent time, sensing a third voltage of the subsequent time from the energy harvesting power supply based on an operating frequency changed by the increased capacitance of the initial capacitor, and comparing the second voltage and the third voltage to determine whether to increase or decrease the increased capacitance of the initial capacitor.

The applying of the first voltage may include applying the first voltage of the present time by short-circuiting a first switch between the initial capacitor and the energy harvesting power supply based on the capacitance of the initial capacitor.

The sensing of the second voltage may include opening the first switch, short-circuiting a second switch between the initial capacitor and the charge sharing capacitor, and sensing the second voltage of the present time from the initial capacitor or the charge sharing capacitor.

The setting of the capacitance of the initial capacitor to be the increased capacitance at the subsequent time may include increasing the capacitance of the initial capacitor at the subsequent time based on a determination to increase the capacitance at a previous time.

The determining of whether to increase or decrease may include determining to increase the increased capacitance of the initial capacitor in response to the third voltage being greater than the second voltage, and determining to decrease the increased capacitance of the initial capacitor, in response to the third voltage being less than the second voltage.

In another general aspect, there is provided a method of tracking a maximum power, including setting a capacitance of an initial capacitor to be a capacitance at a present time, sensing a third voltage from an energy harvesting power supply determined based on the set capacitance of the initial capacitor, setting the capacitance of the initial capacitor to be a decreased capacitance at a subsequent time, applying a first voltage to the initial capacitor through the energy harvesting power supply based on an operating frequency changed by the decreased capacitance of the initial capacitor, sensing a second voltage of the subsequent time by opening the energy harvesting power supply and connecting a charge sharing capacitor to the initial capacitor in parallel, and comparing the second voltage and the third voltage to determine whether to increase or decrease the decreased capacitance of the initial capacitor.

The setting of the capacitance of the initial capacitor to be the decreased capacitance at the subsequent time may include decreasing the capacitance of the initial capacitor at the subsequent time based on a determination to decrease the capacitance at a previous time.

The applying of the first voltage may include applying the first voltage of the subsequent time by shirt-circuiting a first switch between the initial capacitor and the energy harvesting power supply based on the decreased capacitance of the initial capacitor.

The sensing of the second voltage may include opening the first switch, short-circuiting a second switch between the initial capacitor and the charge sharing capacitor, and sensing the second voltage of the subsequent time from the initial capacitor or the charge sharing capacitor.

The determining of whether to increase and decrease may include determining to decrease the decreased capacitance of the initial capacitor, in response to the third voltage being greater than the second voltage, and determining to increase the decreased capacitance of the initial capacitor, in response to the third voltage being less than the second voltage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
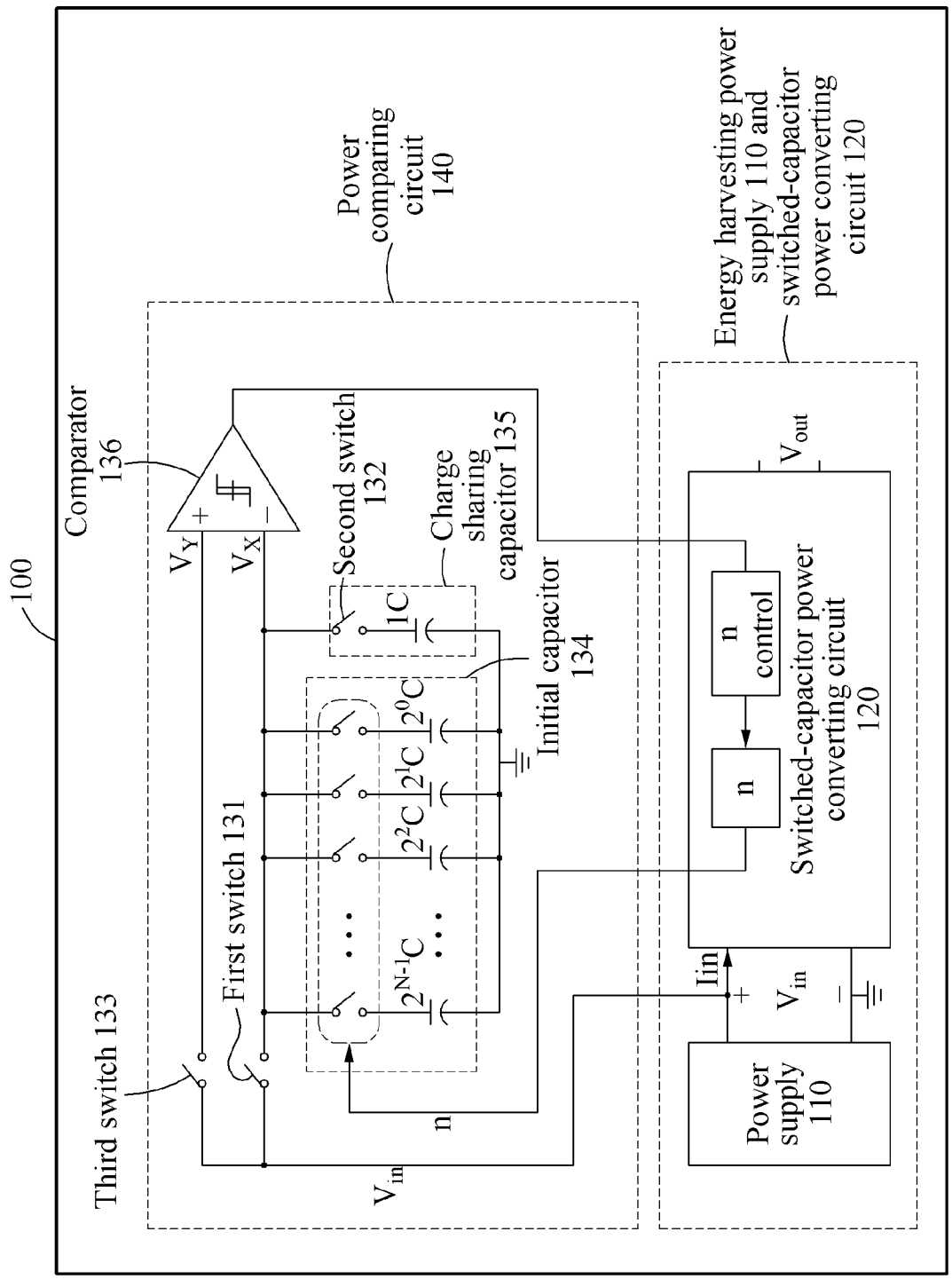
FIG. 1 is an example illustrating an example of a maximum power tracking apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is an example illustrating an example of a maximum power tracking apparatus.

In an example, a maximum power tracking apparatus 100 may track a maximum power at a certain node of an electronic circuit. The maximum power tracking apparatus 100 may adjust an impedance of the electronic circuit such that power at the node becomes maximal. The maximum power tracking apparatus 100 may compare power at two specific points in time and adjust the impedance of the electronic circuit to increase power.

The maximum power tracking apparatus 100 may apply a switched-capacitor converter and use capacitance mapping to compare power at two time points without measuring a current. In addition, the maximum power tracking apparatus 100 may use charge sharing of a capacitor to compare power at two time points with a high resolution even in an analog domain.

In the switched-capacitor converter, an input power may be determined by a product between an input voltage and an input current. In an example, the input current is linearly proportional to "n" which is a digital control value. In an example, the switched-capacitor converter may have a relationship between a current and a voltage as represented by Equation 1 below.

$$I_{in} = f_{sw} Q_{in} = f_{sw} C (V_{out} - V_{in})$$ [Equation 1]

In Equation 1 above, $V_{out}$ and $V_{in}$ are constant values, and $f_{sw}$, denotes an operating frequency of a switch. $Q_{in}$ denotes an amount of electric charges to be transferred to a circuit. $I_{in}$ denotes an input current. C denotes a capacitance of a capacitor. When the frequency $f_{sw}$ is linearly adjusted based on a digital control value n through frequency modulation and such, the input current becomes proportional to n, and thus the input current $I_{in}$ is proportional to nC as represented by Equation 2 below.

$$f_{sw} \rightarrow n f_{sw}, I_{in}(n) = (n f_{sw}) C (V_{out} - V_{in})$$ [Equation 2]

Here, the input power may be as represented by Equation 3 below. To compare an increase and a decrease in the input power without directly measuring a current, it is possible to map, to a current, the capacitance nC proportional to the digital control value n. Then, a relationship may be obtained as represented by Equation 4 below.

$$P_{in}(n) = V_{in} I_{in}(n)$$ [Equation 3]

$$I_{in}(n) \rightarrow nC \ P_{in}(n) \propto V_{in}(nC)$$ [Equation 4]

Referring to Equation 4, input powers $P_{in,t1}$ and $P_{in,t2}$ at specific times t1 and t2 where the digital control value n differs by 1 may be compared as follows. For example, in a case in which a value of n at the first time t1 is N, a value of n at the second time t2 that differs by 1 may be N+1 or N−1.

When n increases, i.e., when the value of n at t2 is N+1, the input power may have a relationship represented by Equation 5 below.

$$P_{int,t1} \propto V_{in,t1}(NC)$$

$$P_{int,t2} \propto V_{in,t2}(N+1)C \quad \text{[Equation 5]}$$

Equation 5 may be modified to Equation 6.

$$P_{in,t2} > P_{in,t1} \quad \text{[Equation 6]}$$
$$V_{in,t2}(N+1)C > V_{in,t1}(N)C$$
$$\therefore V_{in,t2} > \frac{N}{N+1}V_{in,t1}$$

In an example, when n decreases, i.e., when the value of n at t2 is N−1, the input power may have a relationship represented by Equation 7.

$$\frac{(N-1)}{(N-1)+1}V_{in,t2} > V_{in,t1} \quad \text{[Equation 7]}$$

Referring to Equations 6 and 7, for voltages sampled at two time points, by comparing a result of multiplying a voltage at one time point by a fraction $$\frac{N}{N+1} \text{ or } \frac{(N-1)}{(N-1)+1}$$

to a voltage sampled at the other remaining time point, it is possible to compare power at the two time points. Thus, through capacitance mapping, the maximum power tracking apparatus 100 may determine an increase and a decrease in power at two time points using only the voltage without measuring a current.

Here, a value obtained by multiplying a voltage by a fraction may be obtained through charge sharing of a capacitor. For example, there may be a circuit in which, when a switch S1 is open, N capacitors having a capacity of 1C are connected in parallel and charged with a voltage Vi, and a single capacitor having a capacity of 1C is completely discharged. In this example, 1C indicates a capacitance of a unit capacitor.

In this example, when the switch S1 is short-circuited, charge sharing may occur among the capacitors. After a charge transfer due to the charge sharing is finished, a final voltage $V_1$ of a capacitor connected in parallel may be as represented by Equation 8.

$$V_f = \frac{N}{N+1}V_i \quad \text{[Equation 8]}$$

In another example, when N−1 capacitors are connected in parallel and the same operation is performed, the final voltage $V_f$ may be as represented by Equation 9.

$$V_f = \frac{(N-1)}{(N-1)+1}V_i \quad \text{[Equation 9]}$$

Results of Equations 8 and 9 are the same as those of Equations 6 and 7, respectively. Thus, by adjusting the number N of the capacitors connected in parallel and the initial voltage $V_i$ of a capacitor, a multiplication operation needed for power comparison may be performed. The maximum power tracking apparatus 100 may use charge sharing of a capacitor and perform a multiplication operation in an analog domain, thereby maintaining a high resolution.

Referring to FIG. 1, the maximum power tracking apparatus 100 includes an energy harvesting power supply 110, a switched-capacitor power converting circuit 120, and a power comparing circuit 140. The power comparing circuit 140 includes an initial capacitor 134, a charge sharing capacitor 135, a first switch 131, a second switch 132, a third switch 133, and a comparator 136.

The charge sharing capacitor 135 may be connected to the initial capacitor 134 in parallel. The second switch 132 may be disposed between the charge sharing capacitor 135 and the initial capacitor 134. The first switch 131 may be disposed between the energy harvesting power supply 110 and the initial capacitor 134. The third switch 133 may be disposed between the energy harvesting power supply 110 and the comparator 136. The third switch 133 may be used to sample an input voltage Vin at a certain time point. For example, an input voltage may be sampled when the third switch 133 is short-circuited at a time t1, and a voltage Vt1 may be maintained at a node Vy when it is opened again.

The switched-capacitor power converting circuit 120 may control the initial capacitor 134. The switched-capacitor power converting circuit 120 may control a value of the initial capacitor 134 to be nC based on "n" which is a digital control value. Here, C denotes a unit capacitor, and n denotes a parameter that controls a speed at which a power converting circuit operates by controlling an operating frequency of the power converting circuit. The switched-capacitor power converting circuit 120 may determine an operation speed based on the digital control value n. The switched-capacitor power converting circuit 120 may change a voltage for energy harvesting by changing an operation speed of power conversion.

The initial capacitor 134 may include one or more capacitors. The initial capacitor 134 may include capacitors corresponding to a multiple of a power of 2 of a unit capacitor C. For example, the initial capacitor 134 may include from $2^0$ C. to $2^{N-1}$C capacitors, but examples of which are not limited thereto. For example, the initial capacitor 134 may be a combination of all types of capacitors indicating nC based on a natural number n. For another example, the initial capacitor 134 may include a plurality of 1Cs.

Referring to FIG. 1, the initial capacitor 134 may include the capacitors corresponding to the multiple of the power of 2 of the unit capacitor C. Each of the capacitors may be connected to a node Vx through a serial switch. Switches that connect the capacitors to the node Vx may be synchronized to a digital signal n of X bits. Through this, a capacitance proportional to a value of n may be generated. For example, when n to be input is 3 bits (X=3) and has a value of 101 (n=5), 1C and 4C capacitors among 1C, 2C, and 4C capacitors may be connected in parallel to the node Vx. Thus, an initial capacitor having a capacitance of 5C may be set.

A process to be described hereinafter may be repeated or iterated. Each of a previous time, a present time, and a subsequent time to be described hereinafter may indicate a time unit that is classified based on whether the digital control value n is changed. It is assumed that, in a certain step of the iterating process, an initial capacitor at a previous time is stored. However, when the process is started initially, an increase or a decrease in n may be determined in advance.

The energy harvesting power supply 110 may be determined based on an external or internal environment. For example, the energy harvesting power supply 110 may be connected to a solar panel. A current-voltage characteristic of the solar panel may change based on the external environment, such as, for example, weather or illumination. The current-voltage characteristic of the solar panel may change based on the internal environment, such as, for example, a type of the panel or an internal impedance. The following iterating process may be performed at a short time interval, and it is assumed that the external environment is not drastically changed during a corresponding time. Thus, the maximum power tracking apparatus 100 may track a desired maximum power by changing an internal impedance of the maximum power tracking apparatus 100 at a short time interval.

In response to a determination to increase a capacitance of the initial capacitor 134 at a previous time, the switched-capacitor power converting circuit 120 may set the capacitance of the initial capacitor 134 to be a capacitance at a present time. The switched-capacitor power converting circuit 120 may determine "DIR=1" to be the determination of the increase of the initial capacitor 134.

The energy harvesting power supply 110 may apply, to the initial capacitor 134, a first voltage of the present time determined based on the initial capacitor 134. The energy harvesting power supply 110 may short-circuit the first switch 131 and apply the first voltage of the present time to the initial capacitor 134.

After the energy harvesting power supply 110 is opened and the initial capacitor 134 and the charge sharing capacitor 135 are connected in parallel, the comparator 136 may sense a second voltage Vx at the present time from the initial capacitor 134 or the charge sharing capacitor 135. The first switch 131 may be opened and the energy harvesting power supply 110 may be opened. The second switch 132 may be short-circuited and the initial capacitor 134 and the charge sharing capacitor 135 may be connected in parallel. At this point, charge sharing may occur. The comparator 136 may sense the second voltage Vx at the present time from the initial capacitor 134 or the charge sharing capacitor 135.

The switched-capacitor power converting circuit 120 may set the capacitance of the initial capacitor 134 to be an increased capacitance at a subsequent time. The switched-capacitor power converting circuit 120 may set the capacitance of the initial capacitor 134 to be the increased capacitance at the subsequent time based on the determination to increase the capacitance at the previous time.

The energy harvesting power supply 110 may apply a third voltage Vy of the subsequent time to the comparator 136 based on the increased capacitance of the initial capacitor 134.

The comparator 136 may compare the second voltage Vx and the third voltage Vy and determine whether to increase or decrease the increased capacitance of the initial capacitor 134. In response to the third voltage Vy being greater than the second voltage Vx, the comparator 136 may determine to increase the increased capacitance of the initial capacitor 134. The comparator 136 may output "DIR=1." In response to the third voltage Vy being less than the second voltage Vx, the comparator 136 may determine to decrease the increased capacitance of the initial capacitor 134. The comparator 136 may output "DIR=0."

In response to a determination to decrease the capacitance of the initial capacitor 134 at a previous time, the switched-capacitor power converting circuit 120 may set the capacitance of the initial capacitor 134 to be a capacitance at a present time. The switched-capacitor power converting circuit 120 may determine "DIR=0" to be the determination to decrease the capacitance of the initial capacitor 134.

The comparator 136 may sense a third voltage Vy from the energy harvesting power supply 110 determined based on the initial capacitor 134.

The switched-capacitor power converting circuit 120 may set the capacitance of the initial capacitor 134 to be a decreased capacitance at a subsequent time. The switched-capacitor power converting circuit 120 may determine the capacitance of the initial capacitor 134 at the subsequent time to be the decreased capacitance at the subsequent time based on the determination of the decrease at the previous time.

The energy harvesting power supply 110 may apply a first voltage of the subsequent time to the initial capacitor 134 based on the decreased capacitance of the initial capacitor 134. The first switch 131 may be short-circuited, and the energy harvesting power supply 110 may apply the first voltage of the subsequent time to the initial capacitor 134 based on the decreased capacitance of the initial capacitor 134.

After the energy harvesting power supply 110 is opened and the initial capacitor 134 and the charge sharing capacitor 135 are connected in parallel, the comparator 136 may sense a second voltage Vx of the subsequent time from the initial capacitor 134 or the charge sharing capacitor 135. The first switch 131 may be opened and the energy harvesting power supply 110 may be opened. The second switch 132 may be short-circuited and the initial capacitor 134 and the charge sharing capacitor 135 may be connected in parallel. Here, charge sharing may occur. The comparator 136 may sense the second voltage Vx of the subsequent time from the initial capacitor 134 or the charge sharing capacitor 135.

The comparator 136 may compare the second voltage Vx and the third voltage Vy and determine whether to increase or decrease the decreased capacitance of the initial capacitor 134. In response to the third voltage Vy being greater than the second voltage Vx, the comparator 136 may determine to decrease the decreased capacitance of the initial capacitor 134. The comparator 136 may output "DIR=1." In response to the third voltage Vy being less than the second voltage Vx, the comparator 136 may determine to increase the decreased capacitance of the initial capacitor 134. The comparator 136 may output "DIR=0."

Figure 2:
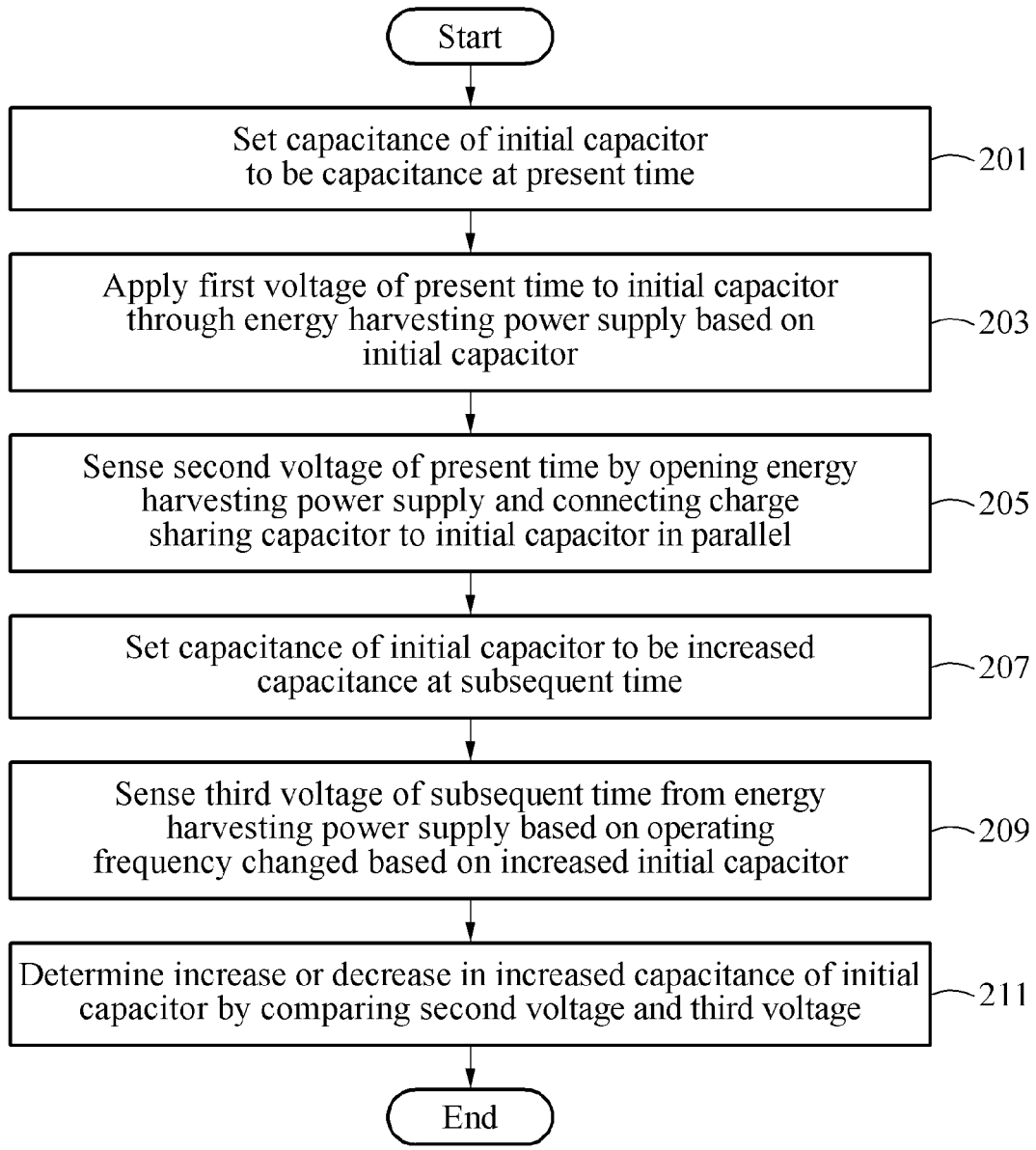
FIG. 2 is a diagram illustrating an example of a method of tracking a maximum power while increasing a capacitance.

FIG. 2 is a diagram illustrating an example of a method of tracking a maximum power while increasing a capacitance. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here. Referring to FIG. 2.

Referring to FIG. 2, in operation 201, the maximum power tracking apparatus 100 sets a capacitance of an initial capacitor to be a capacitance at a present time. The capacitance at the present time may indicate a capacitance before "DIR=1" is applied.

In operation 203, the maximum power tracking apparatus 100 applies, to the initial capacitor, a first voltage of the present time through an energy harvesting power supply determined based on the set capacitance of the initial capacitor. The maximum power tracking apparatus 100 may apply the first voltage of the present time by short-circuiting a first switch between the initial capacitor and the energy harvesting power supply based on the capacitance of the initial capacitor.

In operation 205, the maximum power tracking apparatus 100 senses a second voltage of the present time by opening the energy harvesting power supply and connecting a charge sharing capacitor to the initial capacitor. The maximum power tracking apparatus 100 may open the first switch. The maximum power tracking apparatus 100 may short-circuit a second switch between the initial capacitor and the charge sharing capacitor. The maximum power tracking apparatus 100 may sense the second voltage of the present time from the initial capacitor or the charge sharing capacitor.

In operation 207, the maximum power tracking apparatus 100 may set the capacitance of the initial capacitor to be an increased capacitance at a subsequent time. The maximum power tracking apparatus 100 may increase the capacitance of the initial capacitor at the subsequent time based on a determination to increase the capacitance at a previous time. The maximum power tracking apparatus 100 may increase n by 1 in response to "DIR=1" output at the previous time.

In operation 209, the maximum power tracking apparatus 100 senses a third voltage of a subsequent time from the energy harvesting power supply based on an operating frequency changed based on the increased capacitance of the initial capacitor.

In operation 211, the maximum power tracking apparatus 100 compares the second voltage and the third voltage and determines whether to increase or decrease the increased capacitance of the initial capacitor. In response to the third voltage being greater than the second voltage, the maximum power tracking apparatus 100 may determine to increase the increased capacitance of the initial capacitor. In response to the third voltage being less than the second voltage, the maximum power tracking apparatus 100 may determine to decrease the increased capacitance of the initial capacitor.

Figure 3:
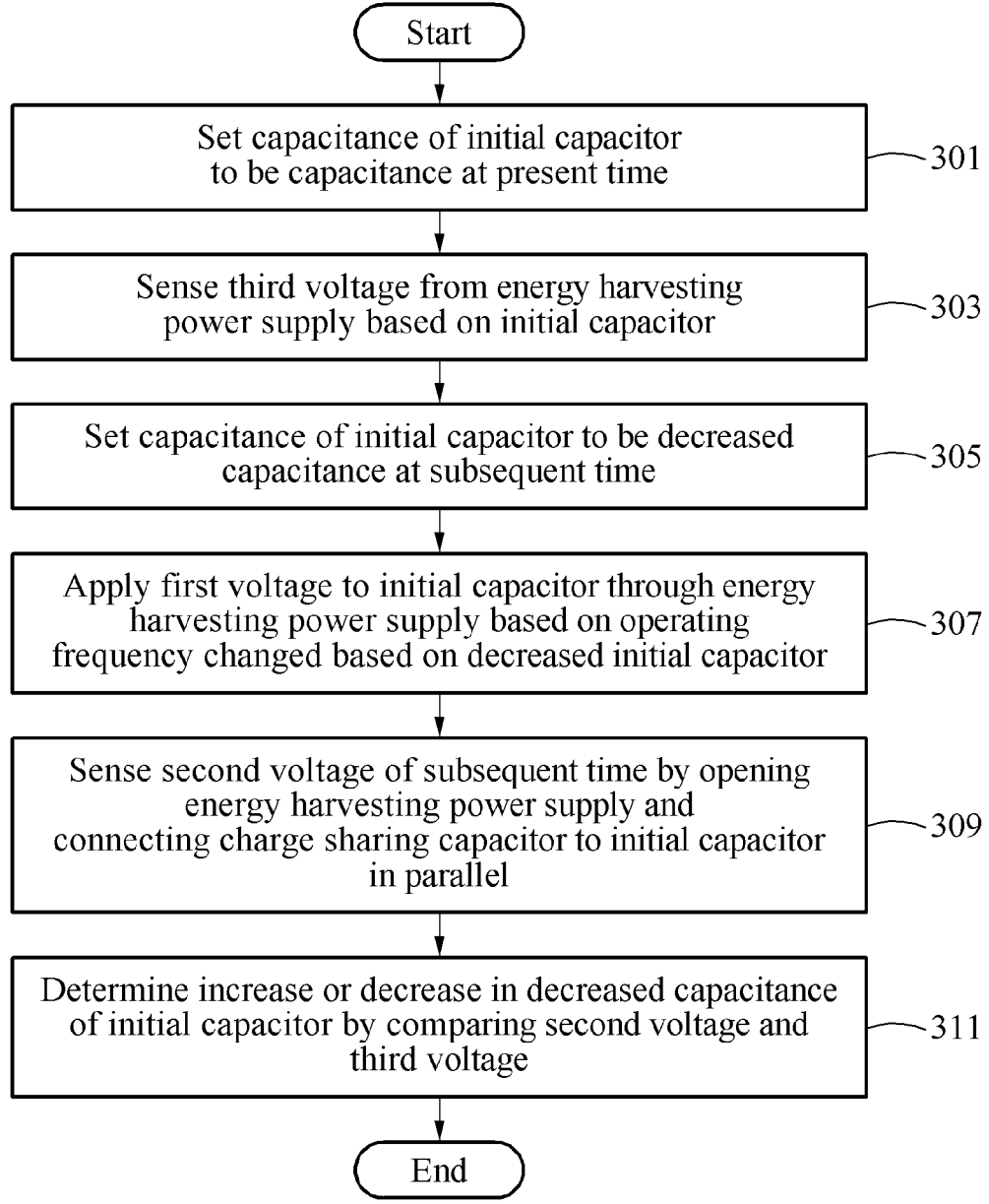
FIG. 3 is a diagram illustrating an example of a method of tracking a maximum power while decreasing a capacitance.

FIG. 3 is a diagram illustrating an example of a method of tracking a maximum power while decreasing a capacitance. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here. Referring to FIG. 3.

Referring to FIG. 3, in operation 301, the maximum power tracking apparatus 100 sets a capacitance of an initial capacitor to be a capacitance at a present time. The capacitance at the present time may indicate a capacitance before "DIR=0" is applied.

In operation 303, the maximum power tracking apparatus 100 senses a third voltage from an energy harvesting power supply that is determined based on the set capacitance of the initial capacitor.

In operation 305, the maximum power tracking apparatus 100 sets the capacitance of the initial capacitor to be a decreased capacitance at a subsequent time. In operation 305, the maximum power tracking apparatus 100 may decrease the capacitance of the initial capacitor at the subsequent time based on a determination to decrease the capacitance at a previous time. The maximum power tracking apparatus 100 may decrease n by 1 in response to "DIR=0" output at the previous time.

In operation 307, the maximum power tracking apparatus 100 applies a first voltage to the initial capacitor through the energy harvesting power supply based on an operating frequency changed based on the decreased capacitance of the initial capacitor. The maximum power tracking apparatus 100 may apply the first voltage of the subsequent time by short-circuiting a first switch between the initial capacitor and the energy harvesting power supply based on the decreased capacitance of the initial capacitor.

In operation 309, the maximum power tracking apparatus 100 senses a second voltage of the subsequent time by opening the energy harvesting power supply and connecting a charge sharing capacitor to the initial capacitor in parallel. In an example, the maximum power tracking apparatus 100 may open the first switch. The maximum power tracking apparatus 100 may short-circuit a second switch between the initial capacitor and the charge sharing capacitor. The maximum power tracking apparatus 100 may sense the second voltage of the subsequent time from the initial capacitor or the charge sharing capacitor.

In operation 311, the maximum power tracking apparatus 100 compares the second voltage and the third voltage and determines whether to increase or decrease the decreased capacitance of the initial capacitor. In response to the third voltage being greater than the second voltage, the maximum power tracking apparatus 100 may determine to decrease the decreased capacitance of the initial capacitor. In response to the third voltage being less than the second voltage, the maximum power tracking apparatus 100 may determine to increase the decreased capacitance of the initial capacitor.

Figure 4:
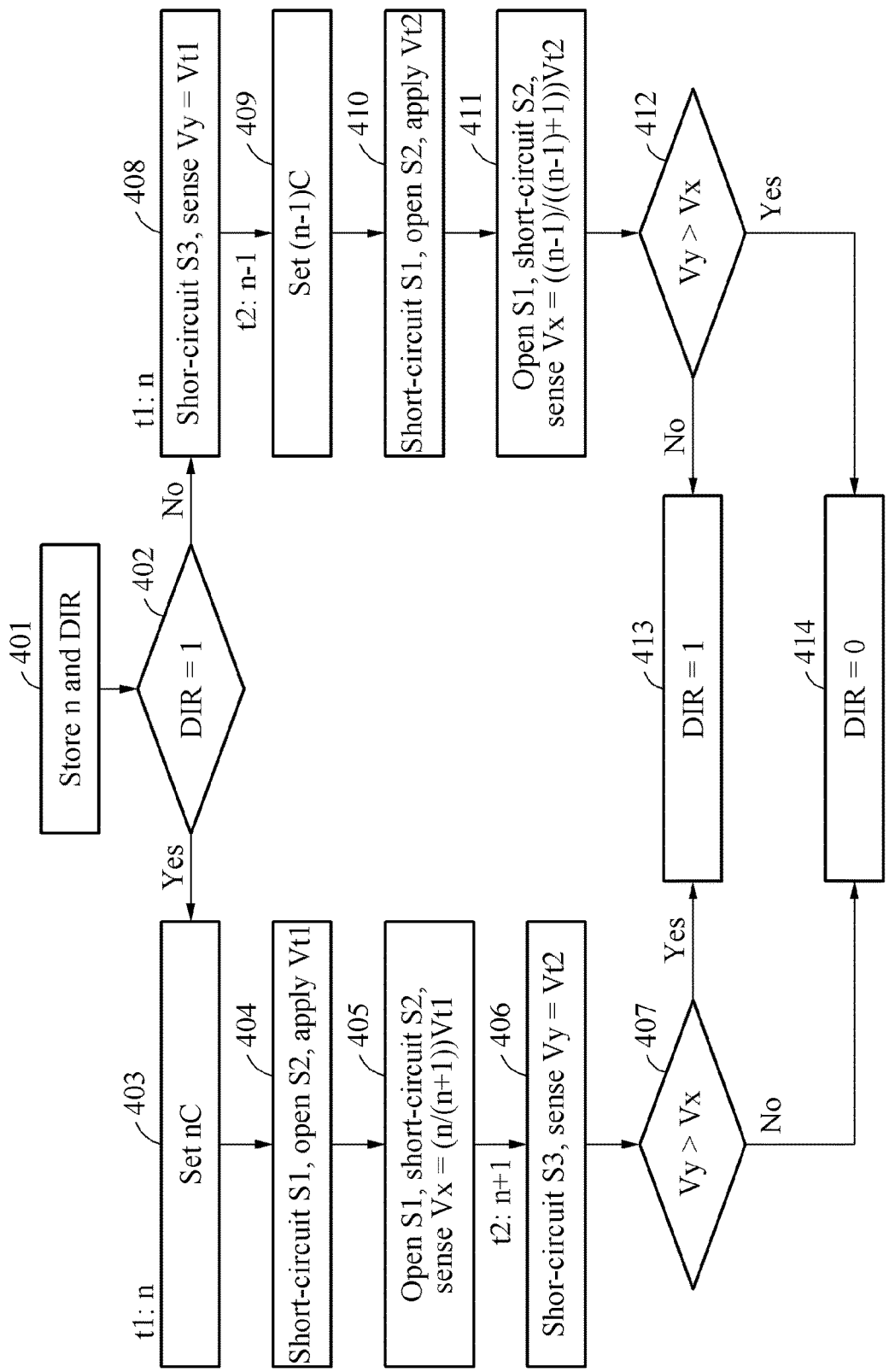
FIG. 4 is a diagram illustrating an example of a method of tracking a maximum power including both capacitance increasing and decreasing scenarios.

FIG. 4 is a diagram illustrating an example of a method of tracking a maximum power including both capacitance increasing and decreasing scenarios. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here. Referring to FIG. 4.

Referring to FIG. 4, in operation 401, the maximum power tracking apparatus 100 stores n and DIR of a previous time. Here, DIR indicates a variable indicating an increase or decrease of n, and indicates an increase if it is 1 and a decrease if it is 0. Operation 401 may correspond to a previous iteration of an iterating process.

In operation 402, the maximum power tracking apparatus 100 determines whether DIR is 1. A present iteration may start from operation 402. In response to DIR being 1, the maximum power tracking apparatus 100 performs operation 403. In response to DIR being 0, the maximum power tracking apparatus 100 performs operation 408.

In operation 403, the maximum power tracking apparatus 100 sets a capacitance of the initial capacitor 134 to be nC at a present time t1. The present time t1 indicates a time at which a digital control value is n.

In operation 404, the maximum power tracking apparatus 100 short-circuits the first switch S1 131 and opens the second switch S2 132 to apply Vt1 to Vx.

In operation 405, the maximum power tracking apparatus 100 opens S1 131 and short-circuits S2 132 to allow Vx to be (n/(n+1))Vt1, and senses Vx.

In operation 406, the maximum power tracking apparatus 100 short-circuits S2 132 and sets the capacitance of the initial capacitor 134 to be (n+1)C at a subsequent time t2. As the initial capacitor 134 changes, Vt2 may be applied to Vy. The maximum power tracking apparatus 100 may sense Vt2. The subsequent time t2 indicates a time at which the digital control value increases to n+1.

In operation 407, the maximum power tracking apparatus 100 compares Vy and Vx. In operation 413, in response to Vy being greater than Vx, the maximum power tracking apparatus 100 stores "DIR=1" to be used for a subsequent iteration. In operation 414, in response to Vy being less than Vx, the maximum power tracking apparatus 100 stores "DIR=0" to be used for the subsequent iteration.

In operation 408, the maximum power tracking apparatus 100 short-circuits S3 133 and senses Vy from an energy harvesting power supply based on the capacitance of the initial capacitor 134 at the present time t1. Vt1 may be applied to Vy.

In operation 409, the maximum power tracking apparatus 100 sets the capacitance of the initial capacitor 134 to be (n−1)C at the subsequent time t2.

In operation 410, the maximum power tracking apparatus 100 short-circuits S1 131 and opens S2 132 to apply Vt2 to Vx.

In operation 411, the maximum power tracking apparatus 100 opens S1 and short-circuits S2 to allow Vx to be ((n−1)/((n−1)+1))Vt2, and senses Vx.

In operation 412, the maximum power tracking apparatus 100 compares Vy and Vx. In operation 413, in response to Vy being less than Vx, the maximum power tracking apparatus 100 stores "DIR=1" to be used for the subsequent iteration. In operation 414, in response to Vy being greater than Vx, the maximum power tracking apparatus 100 stores "DIR=0" to be used for the subsequent iteration.

Figure 5:
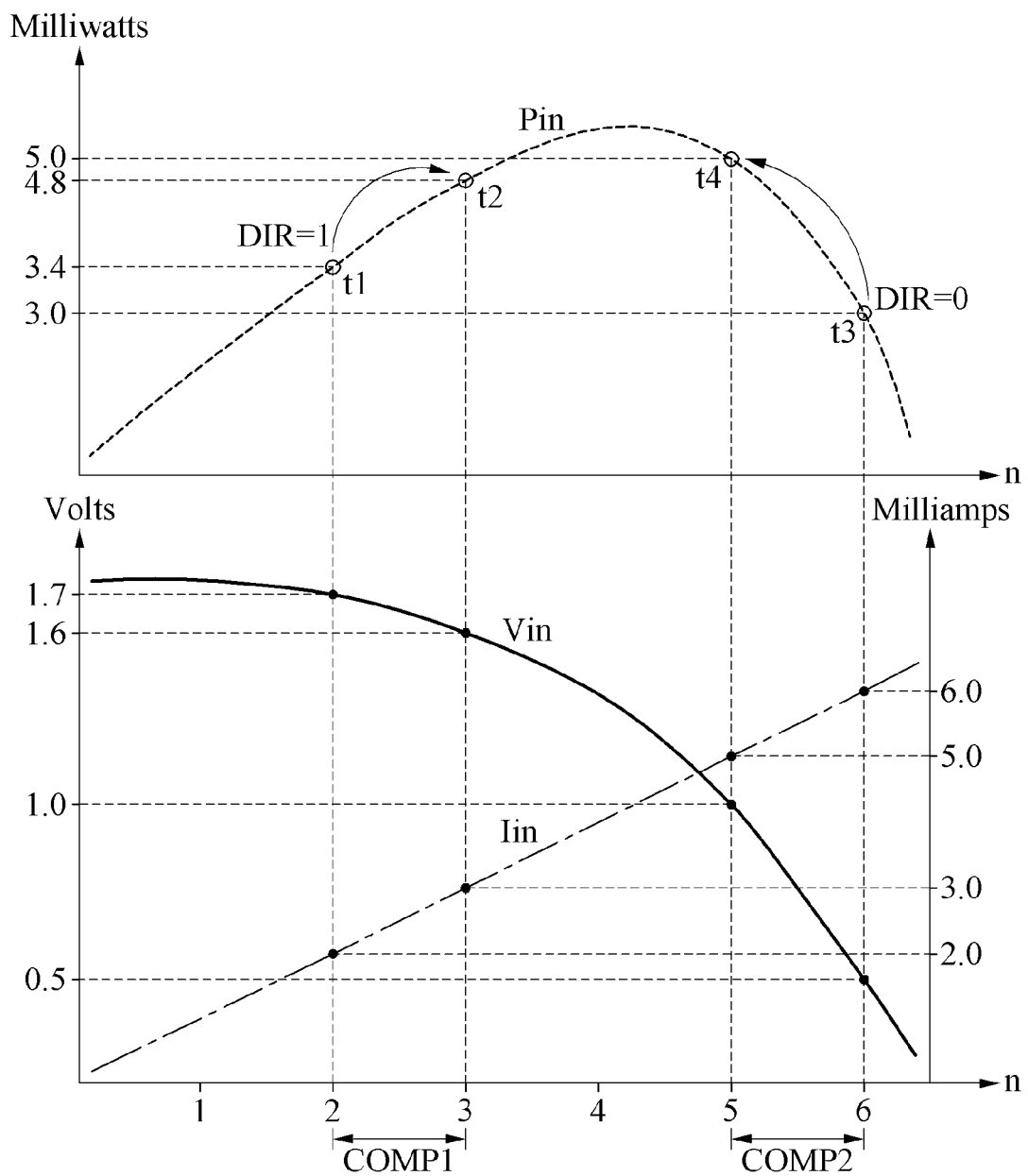
FIG. 5 is an example power graph illustrating power that changes as n increases, and an example voltage-current characteristic graph.

FIG. 5 is an example power graph illustrating power that changes as n increases, and an example voltage-current characteristic graph.

Referring to FIG. 5, COMP1 indicates a scenario in which n increases, and COMP2 indicates a scenario in which n decreases. According to COMP1, n=2 at t1, and a voltage Vt1 (=1.7V) is sampled at a node Vx. Subsequently, at t2, based on "DIR=1," n changes to n+1 to be 3 (n=3). At t2, a voltage Vt2 (=1.6V) is sampled at a node Vy.

Since n=2 at t1, an initial capacitor is set to be 2C. Subsequently, charge sharing occurs, and a voltage of $$\frac{2}{2+1} \times 1.7 = 1.13$$

is applied at the node Vx.

A comparator compares Vx and Vy. Based on a result of $$V_{in.t2} > \frac{N}{N+1} V_{in.t1},$$

i.e., 1.6>1.13, power at t2 is determined to be greater than power at t1 because a comparison result is true. As the power increases, "DIR=1" is maintained.

COMP2 indicates a scenario in which power comparison is performed in a case in which DIR=0. According to COMP2, n=6 at t3, and Vt3 (=0.5V) is sampled at the node Vy. Based on "DIR=0," n changes to n−1 to be 5 (n=5). At t4, Vt4 (=1.0V) is sampled at the node Vx. Dissimilar to the case in which DIR=1, a sampling sequence may be reversed.

Since n=6 at t3, a capacitance corresponding to (6-1)C is set. Subsequently, charge sharing is performed, and a voltage of $$\frac{6-1}{(6-1+1)} \times 1.0 = 0.83$$

is applied to the node Vx. The comparator compares Vx and Vy.

Based on $$V_{in.t3} > \frac{(N-1)}{(N-1)+1} V_{in.t4},$$

i.e., 0.5>0.83, a comparison result is false. The reason why the comparison result is false even though power increased, is that an input sequence of the comparator is reversed unlike the case in which DIR=1. Thus, a result value is opposite. That is, "false" indicates that power at t4 increases from power at t3. As power increases, "DIR=0" is maintained.

When such a process is iterated, n may oscillate based on a maximum power. As described, the maximum power tracking apparatus 100 may have a less power loss without current measurement, and track a maximum power with a high resolution even in an analog domain.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for tracking a maximum power, comprising:

a charge sharing capacitor connected to an initial capacitor in parallel;
a first switch disposed between the initial capacitor and an energy harvesting power supply;
a second switch disposed between the initial capacitor and the charge sharing capacitor;
a third switch disposed between the energy harvesting power supply and a comparator; and
a switched-capacitor power converting circuit configured to control the initial capacitor; wherein
the switched-capacitor power converting circuit is further configured to set the capacitance of the initial capacitor to be a capacitance at a present time,
the energy harvesting power supply is configured to apply, to the initial capacitor, a first voltage of the present time determined based on a set capacitance of the initial capacitor,
the comparator is configured to sense a second voltage of the present time from the initial capacitor or the charge sharing capacitor, in response to the energy harvesting power supply being opened and the initial capacitor and the charge sharing capacitor being connected in parallel,
the switched-capacitor power converting circuit is further configured to set the capacitance of the initial capacitor to be an increased capacitance at a subsequent time,
the energy harvesting power supply is further configured to apply a third voltage of the subsequent time to the comparator based on an operating frequency changed by the increased capacitance of the initial capacitor, and
the comparator is further configured to compare the second voltage and the third voltage and to determine whether to increase or decrease the increased capacitance of the initial capacitor.

2. The apparatus of claim 1, wherein the switched-capacitor power converting circuit is further configured to set the capacitance of the initial capacitor to be the capacitance at the present time, in response to a determination to increase a capacitance of the initial capacitor at a previous time.

3. The apparatus of claim 1, wherein the energy harvesting power supply is configured to:
short-circuit the first switch to apply the first voltage of the present time to the initial capacitor.

4. The apparatus of claim 1, wherein in response to the first switch being opened, and the energy harvesting power supply being opened:
the second switch is short-circuited and the initial capacitor and the charge sharing capacitor are connected in parallel, and
the comparator is configured to sense the second voltage of the present time from the initial capacitor or the charge sharing capacitor.

5. The apparatus of claim 2, wherein the switched-capacitor power converting circuit is further configured to:
set the capacitance of the initial capacitor to be the increased capacitance at the subsequent time based on the determination to increase the capacitance at the previous time.

6. The apparatus of claim 1, wherein the comparator is further configured to:
determine to increase the increased capacitance of the initial capacitor, in response to the third voltage being greater than the second voltage; and
determine to decrease the increased capacitance of the initial capacitor, in response to the third voltage being less than the second voltage.

7. The apparatus of claim 1, wherein, in response to a determination to decrease a capacitance of the initial capacitor at a previous time,
the switched-capacitor power converting circuit is further configured to set the capacitance of the initial capacitor to be a capacitance at the present time,
the comparator is further configured to sense a third voltage from the energy harvesting power supply determined based on the set capacitance of the initial capacitor,
the switched-capacitor power converting circuit is further configured to set the capacitance of the initial capacitor to be a decreased capacitance at the subsequent time,
the energy harvesting power supply is further configured to apply a first voltage of the subsequent time to the initial capacitor based on an operating frequency changed by the decreased capacitance of the initial capacitor,
the comparator is further configured to sense a second voltage of the subsequent time from the initial capacitor or the charge sharing capacitor, in response to the energy harvesting power supply being opened and the initial capacitor and the charge sharing capacitor being connected in parallel, and
the comparator is further configured to compare the second voltage and the third voltage and to determine whether to increase or decrease the decreased capacitance of the initial capacitor.

8. The apparatus of claim 7, wherein the switched-capacitor power converting circuit is further configured to:
set the capacitance of the initial capacitor to be the decreased capacitance of the initial capacitor at the subsequent time based on the determination to decrease the capacitance at the previous time.

9. The apparatus of claim 7, wherein the first switch is short-circuited, and
the energy harvesting power supply is further configured to apply the first voltage of the subsequent time to the initial capacitor based on the decreased capacitance of the initial capacitor.

10. The apparatus of claim 7, wherein:
the first switch is opened, and the energy harvesting power supply is opened,
the second switch is short-circuited and the initial capacitor and the charge sharing capacitor are connected in parallel, and
the comparator is further configured to sense the second voltage of the subsequent time from the initial capacitor or the charge sharing capacitor.

11. The apparatus of claim 7, wherein the comparator is further configured to:
determine to decrease the decreased capacitance of the initial capacitor, in response to the third voltage being greater than the second voltage; and
determine to increase the decreased capacitance of the initial capacitor, in response to the third voltage being less than the second voltage.

12. A method of tracking a maximum power, comprising:
setting a capacitance of an initial capacitor to be a capacitance at a present time;
applying a first voltage of the present time to the initial capacitor through an energy harvesting power supply based on the set capacitance of the initial capacitor;

sensing a second voltage of the present time by opening the energy harvesting power supply and connecting a charge sharing capacitor to the initial capacitor in parallel;

setting the capacitance of the initial capacitor to be an increased capacitance at a subsequent time;

sensing a third voltage of the subsequent time from the energy harvesting power supply based on an operating frequency changed by the increased capacitance of the initial capacitor; and comparing the second voltage and the third voltage to determine whether to increase or decrease the increased capacitance of the initial capacitor.

13. The method of claim 12, wherein the applying of the first voltage comprises:

applying the first voltage of the present time by short-circuiting a first switch between the initial capacitor and the energy harvesting power supply based on the capacitance of the initial capacitor.

14. The method of claim 12, wherein the sensing of the second voltage comprises:

opening the first switch;

short-circuiting a second switch between the initial capacitor and the charge sharing capacitor; and sensing the second voltage of the present time from the initial capacitor or the charge sharing capacitor.

15. The method of claim 12, wherein the setting of the capacitance of the initial capacitor to be the increased capacitance at the subsequent time comprises:

increasing the capacitance of the initial capacitor at the subsequent time based on a determination to increase the capacitance at a previous time.

16. The method of claim 12, wherein the determining of whether to increase or decrease comprises:

determining to increase the increased capacitance of the initial capacitor in response to the third voltage being greater than the second voltage; and determining to decrease the increased capacitance of the initial capacitor, in response to the third voltage being less than the second voltage.

17. A method of tracking a maximum power, comprising:

setting a capacitance of an initial capacitor to be a capacitance at a present time;

sensing a third voltage from an energy harvesting power supply determined based on the set capacitance of the initial capacitor;

setting the capacitance of the initial capacitor to be a decreased capacitance at a subsequent time;

applying a first voltage to the initial capacitor through the energy harvesting power supply based on an operating frequency changed by the decreased capacitance of the initial capacitor;

sensing a second voltage of the subsequent time by opening the energy harvesting power supply and connecting a charge sharing capacitor to the initial capacitor in parallel; and comparing the second voltage and the third voltage to determine whether to increase or decrease the decreased capacitance of the initial capacitor.

18. The method of claim 17, wherein the setting of the capacitance of the initial capacitor to be the decreased capacitance at the subsequent time comprises:

decreasing the capacitance of the initial capacitor at the subsequent time based on a determination to decrease the capacitance at a previous time.

19. The method of claim 17, wherein the applying of the first voltage comprises:

applying the first voltage of the subsequent time by shirt-circuiting a first switch between the initial capacitor and the energy harvesting power supply based on the decreased capacitance of the initial capacitor.

20. The method of claim 17, wherein the sensing of the second voltage comprises:

opening the first switch;

short-circuiting a second switch between the initial capacitor and the charge sharing capacitor; and sensing the second voltage of the subsequent time from the initial capacitor or the charge sharing capacitor.

21. The method of claim 17, wherein the determining of whether to increase and decrease comprises:

determining to decrease the decreased capacitance of the initial capacitor, in response to the third voltage being greater than the second voltage; and determining to increase the decreased capacitance of the initial capacitor, in response to the third voltage being less than the second voltage.

* * * * *